United States Patent [19]
Mekjean et al.

[11] 3,719,225
[45] March 6, 1973

[54] METHOD OF STORING HEAT
[75] Inventors: Matthew Mekjean, Niagara Falls, N.Y.; James S. Sconce, Lewiston, N.J.
[73] Assignee: Hooper Chemical Corporation, Niagara Falls, N.Y.
[22] Filed: Feb. 13, 1969
[21] Appl. No.: 799,101

Related U.S. Application Data

[63] Continuation-in-part of Ser. No. 636,544, May 5, 1967, abandoned, which is a continuation of Ser. No. 329,246, Dec. 9, 1963, abandoned.

[52] U.S. Cl. ........................................165/1, 165/104
[51] Int. Cl. ..............................................F28d 13/00
[58] Field of Search ......165/18, 104, 1; 126/44, 263; 252/70

[56] References Cited

UNITED STATES PATENTS 2,556,387  6/1951  Ayeri et al. ..............................23/184
2,677,664  5/1954  Telkes ........................................252/70

OTHER PUBLICATIONS

"Primising Heat Storage Material Found Through Research" Edison Electric Institute Bulletin, (1962), pages 49, 50.
Metallic Corrosion Inhibitors, I. N. Putilua et al. June 12, 1957, New York, page 10.
The Corrosion Handbook, H. H. Ublig et al. New York, (1948), page 637.

*Primary Examiner*—Charles Sukalo
*Attorney*—Peter F. Casella, Donald C. Studley, Richard P. Mueller, James F. Mudd and William J. Schramm

[57] ABSTRACT

This invention relates to a method of transferring heat and heat storage composition, employing a substantially anhydrous composition of alkali metal hydroxide, alkali metal nitrate and one or more of several additives. The operating temperature is from 250°–1,250° Fahrenheit.

10 Claims, No Drawings

METHOD OF STORING HEAT

This application is a continuation-in-part of copending application, Ser. No. 636,544, filed May 5, 1967 and now abandoned which is a continuation of Ser. No. 329,246, filed Dec. 9, 1963 and now abandoned.

This invention relates to a heat storage and transfer medium. More particularly, it relates to a method of storing heat and transferring it by a medium that is substantially non-corrosive.

Various means are utilized today as heat transfer mediums. For example, steam under pressure, circulating hot water, liquid sodium, forced hot air, electrical heating elements, and the like, are employed to transfer heat. However, the physical and chemical characteristics of these heat transfer media do not allow them to act as heat storage media for long periods of time. To be utilized for heat storage purposes, a medium should satisfy the following physical and chemical characteristics. It should have at least a high heat capacity, a long liquid range, and a low vapor pressure. Still other desirable features are that the composition be capable of losing heat slowly and uniformly. A heat storage medium should also be capable of being readily heated to a high temperature by conventional heating means, e.g., electricity, oil, gas or coal, and retaining the heat for a sufficient period of time after the source of heat is withdrawn. This latter characteristic will allow the medium to act as a source of heat to be drawn on by heat transfer means, e.g., air ducts, water, liquid sodium, etc., which will transfer heat to areas that are located at some distance from the source of heat. Media that satisfactorily meet these characteristics have been difficult to obtain.

In accordance with this invention, a method for transferring heat has been found so that it may be readily available for heat exchange purposes, comprising heating to a temperature of about 250° to 1250° F. in a steel container, a heat storage medium comprising at least three components:

a. a substantially anhydrous composition of at least 50 percent by weight of an alkali metal hydroxide;

b. 1 to 49 percent by weight of alkali metal nitrate and, c. 0.1 to 30 percent by weight of an additive selected from the group consisting of iron, ferrites, $MnO_2$, $SnO_2$, $TiO_2$, alkali metal and alkaline earth metal aluminates, chromates, carbonates, dichromates, manganates, permanganates, phosphates, pyrophosphates and mixtures thereof and subsequently withdrawing heat from said heat storage medium.

Further, it has been found that by the addition of various additives such as iron, ferrites, $MnO_2$, $SnO_2$, $TiO_2$ alkali metal and alkaline earth metal chromates, carbonates, dichromates, phosphates, pyrophosphates, manganates, permanganates, aluminates, and mixtures thereof, corrosion of metals in contact with the alkali metal hydroxide and nitrate is substantially reduced to give a long life to the medium and the metal. The additive to be added will vary depending on the heat storage medium and the metal container utilized.

This invention utilizes a medium for a heat storage and/or heat transfer. The term "heat storage" medium, as utilized in this description, means a medium from which the last increment of useful heat may be withdrawn from the system at the required rate of not less than 7,500 Btu per hour per 100,000 Btu of useful heat storage capacity. The term "heat transfer" as utilized in this description means any material utilized to convey heat from one area to another.

Examples of alkali metal hydroxides that may be utilized in this invention are the hydroxides of potassium, sodium, lithium, rubidium, cesium and mixtures thereof. Among the alkali metal nitrates that may be used are nitrates of potassium, sodium, lithium, rubidium, cesium and mixtures thereof.

Although it is preferred to utilize sodium hydroxide as the major constituent of the storage medium, mixtures of the alkali metal hydroxides, e.g., sodium and potassium hydroxides, may also be employed. It has been found that the corrosiveness of the caustic is greatly inhibited when the additives set forth herein are added to a salt composition that is kept out of contact with the atmosphere, e.g., a system where the only air that enters and exits is caused by the heating and cooling of the storage medium. Thus, air may be present in about 5 percent of the container. Thus, about from 0.001 to about 5 parts of air associated with about 100 parts of medium may be tolerated.

Further, these additives may be employed to reduce corrosion in low carbon steel reservoirs, such as steel bearing an American Iron and Steel Institute Number 1020, and lower, classification. Nickel steel and nickel may also be utilized as containers for this system disclosed herein with beneficial results. It has also been found that by saturating the salt bath with iron particles, corrosion will also be inhibited. The amount of corrosion inhibitor additive that may be added to the salt composition may vary from about 0.1 percent to about 30 percent by weight of the heat storage composition depending on solubilities and melting points desired. It is one of the desirable characteristics of the medium to be employed that it have a low melting point and remain in a liquid state over a range of about 400° F. to allow for a more efficient removal of heat from the medium. Better results with respect to corrosion have been obtained when the additive is present in from 0.1 to about 5 percent of the salt medium. Another preferred range is when the salt medium contains from 0.1 to 2.0 percent of an additive.

The alkali metal nitrate may be present in the medium in an amount equal to from 1 to about 49 percent by weight of the mixture, with the more preferred amount being from 1 to about 30 percent by weight and the most preferred amount being from about 5 to 10 percent.

It has been further found that upon utilizing the salt bath compositions set forth herein that upon heating them between a temperature of from 250° to about 1200° F. and removing the source of heat, the loss of heat from the composition is gradual and in a series of steps. It has been found that about one-third of the heat capacity is released from between 1,200° to its freezing point, about 560° F., depending on composition. Thereafter, about another one-third of its heat is released at the freezing point as the heat of fusion, with the balance of stored heat from the composition being released as it cools to about 250° F.

It is thus seen that the salt compositions of the present invention have been found to be surprisingly desirable as they have a long liquid range between the melting point and boiling point.

To more fully understand the invention, one may compare the composition disclosed herein with water. Water may be utilized as a heat storage medium, but it has inherent physical properties which limit its desirability. It can store heat only at low temperature levels (at atmospheric pressure), making the volume of water required to store heat unacceptable and impractical. For example, to store 350,000 Btu at atmospheric pressure at a temperature of from 105° to 205° F., a water system would require a tank with a minimum capacity of 58.3 cubic feet, or 437 gallons, without allowing any space for air or vapor above the liquid. In contrast to water, the preferred solid molten anhydrous metal alkali hydroxide mixture of the invention, i.e., about 90 percent sodium hydroxide, 8.0 percent sodium nitrate, and about 1 percent sodium dichromate operating from 250° to about 1,000° F., can store 350,000 Btu in a volume of 6.3 cubic feet, or 47.2 gallons.

The salt composition may be maintained within any suitable heat storage system. It has been found that a properly insulated container or module fabricated of materials, such as mild steel, as set forth above, low carbon steel, nickel steel, nickel and nickel alloys, would serve as materials of construction.

The heat storage mediums should be capable of operating in the range of from about 250° to 1,250° F. and ideally, at much higher temperatures.

When operating at these temperatures it is obvious that the system is substantially anhydrous. Accordingly therefore it is anticipated that the additives employed in this invention (temperature range of 250° to 1250°F) may not be effective in aqueous systems operating at less than the boiling point of water.

The additives, in addition to decreasing the corrosive effect of fused caustic, also impart other desirable properties to the system such as decreasing the creaking of the overall system. In practice, as the heat storage composition solidifies, it forms a very tenacious bond with the metal container. As the heat storage composition contracts, it is believed that the breaking away or release of the adhesive bond, causes the metal container to make cracking or breaking noises which would be echoed through the heat ducts of a heating system.

The additives employed in this invention also promote a lower melting point of the fused caustic, thereby allowing the caustic to be more conveniently used as a liquid over a broader temperature range. Further, the additives promote a broad slush temperature range. As the temperature of the caustic mixture drops, heat can be withdrawn. When the slush range is reached, a large amount of heat can be withdrawn without a correspondingly large decrease in the temperature of the caustic mixture. By the term "slush" is meant a mixture of solid and liquid caustic and other salt additives.

It has been further found that because of the tenacious bond formed by caustic with the container walls, that the use of these additives promote "nucleation", i.e., that the caustic will solidify on nuclei throughout the liquid medium rather than solely solidifying on the container walls.

The following examples are given to illustrate the present invention and are not to be taken as limitative. All parts are by weight and temperatures are in degrees Fahrenheit, unless otherwise set forth.

EXAMPLES 1 - HEAT STORAGE MEDIA

The heat storage capacities of the mixtures set forth in Table I were studied to evaluate their heat storage qualities.

TABLE I

| Components | Percentage of Component in a Heat Storage Media | | | |
|---|---|---|---|---|
| | No. 1 | No. 2 | No. 3 | No. 4 |
| Sodium hydroxide | 89.0 | 84.0 | 84.0 | 93.0 |
| Potassium hydroxide | 0.8 | 0.8 | 0.8 | |
| Sodium nitrate | 8.0 | 8.0 | 8.0 | |
| Sodium chloride | 1.0 | 1.0 | 1.0 | 1.0 |
| Sodium carbonate | 1.0 | 1.0 | 1.0 | 1.0 |
| Manganese dioxide | 0.2 | 0.2 | 0.2 | |
| Sodium chromate | | 5.0 | | |
| Sodium phosphate | | | 5.0 | 5.0 |

The heat capacities of these mixtures were determined in a drop calorimeter wherein the thermal constants of its component parts were carefully calibrated. In each instance, a small, definite weight of the sample to be measured was placed and sealed in a stainless steel capsule which incorporated a temperature-sensing thermocouple. The capsule was then heated in a thermally-isolated furnace to the desired temperature. At this point, the capsule was dropped into an ice bath of the calorimeter. When the temperature of the sample reached a pre-established zero level, in each case 250° F., the capsule was removed and the quantity of heat transferred into the ice bath was measured.

TABLE II

| Mix | Heat Content | | | Change in BTU/lb. |
|---|---|---|---|---|
| | No. 1 | No. 2 | No. 3 | No. 4 |
| BTU to raise solid 250°F. to 566°F. | 127 | 124 | 124 | 126 |
| BTU to convert solid to liquid at 566°F. | 157 | 152 | 152 | 157 |
| BTU to raise liquid from 566°F. to 1,000°F. | 199 | 195 | 196 | 197 |
| Total Heat Content from 250°F. to 1,000°F. | 483 | 471 | 472 | 480 |

TABLE III

| | Percentage of component in each heat storage media | | | | | | |
|---|---|---|---|---|---|---|---|
| | No. 5 | No. 6 | No. 7 | No. 8 | No. 9 | No. 10 | No. 11 |
| Sodium hydroxide | 89.0 | 89.8 | 84.0 | 80.55 | 86.11 | 83.80 | 93.0 |
| Potassium hydroxide | 0.8 | | 0.8 | 0.73 | | | |
| Sodium nitrate | 8.0 | 8.0 | 8.0 | 7.32 | 7.67 | 8.0 | |
| Sodium chloride | 1.0 | 1.0 | 1.0 | 1.37 | 0.96 | 1.50 | 1.0 |
| Sodium carbonate | 1.0 | 1.0 | 1.0 | 1.37 | 0.96 | 1.50 | 1.0 |
| Sodium permanganate | 0.2 | 0.2 | | | | | |
| Manganese dioxide | | 0.2 | 0.2 | 0.18 | 0.19 | | |
| Sodium chromate | | | 5.0 | | | | |
| Sodium phosphate | | | | | | | 5.0 |
| Mixed oxides of iron | | | | 8.33 | | | |
| Dissolved iron | | | | 0.14 | 0.08 | | |
| Sodium ferrite | | | | | 4.02 | | |
| Sodium tetraborate | | | | | | 5.0 | |

It was determined, as charted in Table II, how much heat was released on cooling from the freezing point, about 550° F. down to the 250° F. zero level, to cool from 1,000° F. down to the freezing point, and finally, a determination was conducted on how much heat was released by cooling the sample from 1,000° to 250° F. This established the total heat content, from which the heat-of-fusion at the freezing point may be calculated by difference. Each of the above determinations was repeated as a check on accuracy. The size of the sample used in each instance was 10 grams, the average heat capacity data obtained in calories per gram was converted into the more conventional BTU/lb.

These examples illustrate the excellent heat capacities of the mixtures of heat storage media set forth herein, and their availability to act as heat exchange media.

EXAMPLES 5 – 11

The following examples illustrate the corrosion inhibiting effect of the additives of this invention. Table III sets forth the components utilized to form the heat storage media of Examples 5-11 The examples were run in accordance with a standard corrosion test recommended by the American Society for Testing Material A-279-44T. In each example, unless otherwise stated, steel, having a Society of Automotive Engineers' classification number 1020, and nickel coupons were subjected to the heat storage media for three successive periods of 48 hours, 48 hours, and 168 hours, a total of 264 hours, weighing before and after each period.

Two thousand parts of the salt mixture, of Example 5 was melted in an electric furnace. The temperature of this melt was raised and maintained at a temperature of 950° F.

Three standard SAE 1010 steel panels, each 3 × 5 inches, suspended from an overhanging cross-bar, were immersed in the melt, each hanging from an SAE 1010 steel wire which was electrically insulated from the cross-bar. The test panels, numbers 1, 2, and 3, were pre-weighed and subjected to the full 48 hours, 48 hours and 168 hours corrosion test.

Table IV is a tabulation of the results obtained:

TABLE IV

| | Utilizing Salt Media of Example 5 | | |
| --- | --- | --- | --- |
| | Panel No. 1 | Panel No. 2 | Panel No. 3 |
| Loss after 1st 48 hours | 0.9314 | 0.9558 | 1.0079 |
| Loss after 2nd 48 hours | 0.6947 | 0.8609 | 0.9141 |
| Loss after next 168 hours | 2.5274 | 2.2899 | 2.1801 |
| Total loss in 264 hours | 4.1535 | 4.1066 | 4.1021 |

Averaging out all the data on the three test panels, we obtain the following:

| Time Interval | Average Individual Panel loss (parts) | Average Individual Cumulative Panel loss (parts) |
| --- | --- | --- |
| 1st 48 hour loss | 0.9650 | 0.9650 |
| 2nd 48 hour loss | 0.8232 | 1.7882 |
| Next 168 hour loss | 2.3324 | 4.1206 |

This data represents a reasonably slow rate of corrosion. To evaluate corrosion in systems which would be substantially free of air, the temperature of the salt bath was raised by 225°, thus, accelerating corrosion processes. Table V sets forth the data obtained when the heat storage media of Example 5 is maintained at 1,175° F. Panels 4 and 5 were completely immersed in the salt bath, whereas, Panel 6 was only partially immersed.

TABLE V

| | Panel No. 4 | Panel No. 5 | Panel No. 6 |
| --- | --- | --- | --- |
| Original wt. (parts) | 48.3216 | 48.6020 | 47.8680 |
| Wt. after 48 hours | 40.9260 | 42.3492 | 42.7643 |
| 48 hour wt. loss | 7.3956 | 6.2528 | 5.1037 |
| Exposed area (sq. in.) | 29.7292 | 29.7065 | 23.25 |
| Parts lost/sq.in./48 hr | 0.249 | 0.211 | 0.219 |
| Final appearance | Pitted | Pitted | Shearing at air-liquid interface and grooving. |

For the completely immersed panels at 1175 degrees Fahrenheit, the average weight loss for the first 48 hours is 6.8242 parts. The loss at 1,175° F. is greater than the average weight loss for the first 48 hours of Panels 1, 2, and 3, in which the average weight loss was 0.9650 parts at 950 ° F.

By dividing the average loss at 1,175° F. by the average loss at 950° F, the ratio is 6.8242/0.9650 or 7.08. From this, it was assumed that by raising the temperature from 950° F. to 1175° F. (225° Fahrenheit), that the corrosion of steel is accelerated by a factor of 7.08. At 1,175° F., corrosion experienced on steel is 7.08 times greater than it would have been at 950° F. A salt system free of air was also assumed to react on steel in a manner similar to that experienced in high temperature baths.

This is the philosophy of Examples 6 through 11 which were performed at 1,175° F.

Table VI sets forth the results obtained when utilizing the heat storage media of Example 6 in contact with steel, having a Society of Automotive Engineers' classification number 1020, nickel coupons.

TABLE VI

| | SAE 1020 Steel | | Nickel | |
| --- | --- | --- | --- | --- |
| | Immersed Panel No. 7 | partially immersed panel No. 8 | immersed panel No. 9 | partially immersed panel No. 10 |
| 1st 48 hr loss | 25.0 | 22.0 | .6848 | .2613 |
| 2nd 48 hr loss | 12.9 | 14.9 | 1.0233 | .4587 |
| Next 168 hr loss | 36.4 | 25.6 | 1.3960 | .7108 |
| Loss in 264 hr test | 74.3 | 72.5 | 3.1141 | 1.4308 |
| Appearance | Smooth | Deeply Grooved | Smooth | Slightly Grooved |

The data in Tables VII, VII, IX, and X sets forth the results obtained with the salt bath of Examples 7, 8, 9 & 10 respectively.

TABLE VII

| | Results of Example 7 | | | |
| --- | --- | --- | --- | --- |
| | SAE 1020 Steel | | Nickel | |
| | immersed Panel No. 11 | partially immersed Panel No. 12 | immersed Panel No. 13 | partially immersed panel No. 14 |
| Original Parts | 1436.7 | 1430.2 | 78.2976 | 78.2678 |
| Loss after 48 hr | 11.7 | 7.9 | .4210 | .1970 |
| Loss next 48 hr | 7.6 | 4.9 | .6276 | .4308 |
| Loss next 168 hr | 23.4 | 24.6 | .9101 | .3782 |
| Total after 264 hr | 42.7 | 37.4 | 1.9487 | 1.0060 |

TABLE VIII

Results of Example 8

|  | SAE 1020 Steel | | Nickel | |
|---|---|---|---|---|
|  | immersed Panel No. 21 | partially immersed Panel No. 22 | immersed Panel No. 23 | partially immersed panel No. 24 |
| Loss-1st 48 hr | 0.9 | 0.6 | .0901 | .1026 |
| Loss-2nd 48 hr | 1.0 | 1.1 | .0316 | +.0023(gain) |
| Loss next 168 hr | 0.4 | 0.2 | .1219 | .0741 |
| Total loss 264 Hrs | 2.3 | 1.9 | .2446 | .1744 |

TABLE IX

Results of Example 9

|  | SAE 1020 Steel | | Nickel | |
|---|---|---|---|---|
|  | Immersed Panel No. 25 | partially immersed panel No. 26 | immersed panel No. 27 | partially immersed panel No. 28 |
| 1st-48 hr loss | 5.2 | 3.7 | .3123 | .1671 |
| 2nd-58 hr loss | 10.2 | 4.7 | .7884 | .3585 |
| 168 hr loss | 33.4 | 21.1 | 1.6166 | .4597 |
| Total loss 264 Hrs. | 48.8 | 29.5 | 2.7173 | .9853 |

TABLE X

Results of Example 10

| Panel | SAE 1020 Steel | | Nickel | |
|---|---|---|---|---|
|  | Immersed No. 29 | partially immersed panel No. 30 | immersed panel No. 31 | partially immersed panel No. 32 |
| Original Parts | 1488.6 | 1492.5 | 70.0468 | 70.7576 |
| Loss after 24 hours | 8.8 | 7.5 | .4050 | .2355 |
| After 48 Hours | 12.5 | 6.7 | +.0972(gain) | .3159 |
| Next 48 Hours | 13.1 | 4.1 | 1.2217 | .2429 |
| Total loss 120 hours | 34.4 | 18.3 | 1.5295 | 0.7943 |

From these data, it is seen that sodium chromate, mixed oxides of iron, dissolved iron, sodium ferrite and sodium tetraborate, when added to a heat storage media tend to inhibit corrosion of the metals in contact therewith.

In Example 11 the temperature was again maintained at 1,175° F. for accelerated corrosion tests. A metal coupon of molybdenum was introduced to the melt and immersed for a period of about 3 hours. Except for a slight visible discoloration, there was no visible change, and no weight loss in the metal coupon.

A coupon of 2-S aluminum (commercial purity) was also completely immersed into the high-temperature melt of Example 11. Frequent visual examination of the sample, about every 10 minutes, in the melt exhibited no change, no reaction nor activity. After about 3 hours, the coupon was withdrawn, quenched quickly in water and then neutralized in 10 percent Nitric Acid, washed and dried. There was still no visual evidence of corrosion. The aluminum coupon, itself, exhibited a slightly mottled discoloration of gray patches intermingled with the metallic luster of the base metal. There was no weight loss.

A Parker Rust Proof standard 3 × 5 inch Steel panel (Society of Automotive Engineers, 1010) was immersed in the melt of Example 11. It was allowed to remain for 24 hours, at the end of which time it was removed, quenched in water and dried. The originally bright surface was slightly discolored. There was no visible evidence of corrosion. On weighing the coupon for a weight loss, sample actually gained a slight amount of weight. This was attributed to the slight discoloration formed on the surface.

EXAMPLE 12

A heat storage container, constructed of 16-gauge mild steel was charged with 1,332 parts of a molten heat storage medium maintained at about 700° F., of the following composition expressed as per cent by weight on a dry basis:

| Sodium hydroxide | 87.45 |
|---|---|
| Sodium nitrate | 7.62 |
| Sodium chloride | 1.81 |
| Sodium carbonate | 1.79 |
| Sodium chromate | 1.30 |
| Total | 99.97 |

This composition was charged to the heat storage container so as to substantially eliminate air and moisture. Heat was radiated to the surrounding still air at a rate such that 18.0 hours later the temperature of the tanks had dropped to 115° F.

EXAMPLE 13

A 14-gauge mild steel heat storage vessel was filled with 1,332 parts of the following composition, expressed as weight per cent of the dry chemicals, which was pumped into the vessel at an initial temperature of 700° F.

| Sodium hydroxide | 87.69 |
|---|---|
| Sodium nitrate | 8.00 |
| Sodium chloride | 1.50 |
| Sodium carbonate | 1.50 |
| Manganese dioxide | 0.20 |
| Sodium dichromate | 1.11 |
| Total | 100.00 |

The mixture was allowed to cool without forced-air circulation.

Eighteen hours later, the vessel temperature was 110° F. Although the temperature continued to drop in the next several hours, no sounds whatever originated from the vessel. This was a low noise-level, creakless mixture. In addition to sodium dichromate, other additives which reduce noises in heat storage mixtures are alkali metal and alkaline earth metal carbonates and phosphates.

EXAMPLE 14

A vessel, in accordance with Example 13, was again filled with a composition disclosed in Example 13. The mixture in this vessel was heated to about 950° F. and then allowed to cool. This cycle was repeated over a period of 2 months, at the end of which time the steel vessel was examined for corrosion. On calculations, it was found that approximately 1,000th of an inch of the steel container had corroded. This clearly evidences the noncorrosiveness of the mixture over substantial periods of time.

EXAMPLE 15

Another series of tests were conducted as follows:

Test coupons were fabricated from standard A1S1 1010 mild steel panels. Coupons were sheared to size and were all found to measure 11 centimeters long by 3.9 centimeters wide by 0.11 centimeters thick. Each specimen contained ¼ inch diameter hanging hole. The total exposed area of each specimen was computed to be 0.884 square decimeters. Each coupon was degreased with trichloroethylene, scrubbed with a mildly abrasive soap, hot water rinsed, acetone dried, decicated and weighed to the nearest 0.0001 gram. The coupons were again decicated. Four corrosion coupons were totally immersed in each composition, as described below, suspended by means of an S-shaped hanging hook in a nickel pot. The nickel pots were three inches in diameter by 10 inches high fabricated of No. 10 nickel pipe, with welded and reinforced bottoms and open tops. A piece of nickel rod was inserted through the bottom of the pot and used for supporting the hanging hooks. Sodium hydroxide was added to each pot at 325° and allowed to completely melt. Sodium nitrate was then added and also allowed to melt. The other additives were added and the temperature increased to 475° C. After two days of exposure, two specimens were removed for initial results and replaced with two more specimens. Two specimens were removed after four days of exposure time and the remaining two specimens were removed after 30 days exposure. The weight change in milligrams per square decimeter are calculated are described below in terms of a corrosion rate in mills per year.

All samples contain 5 percent by weight of each additive, as indicated. The additives were mixed with a composition containing 92% NaOH and 8% $NaNO_3$

| ADDITIVE | Corrosion Rate (mils/yr) | | |
|---|---|---|---|
| | 2 Days | 4 Days | 30 Days |
| None (92% NaOH - 8% $NaNO_3$) | 47 | 31 | 26 |
| $Fe_2O_3$ + Fe Powder | 47 | 33 | 21 |
| $NaMnO_4$ | 53 | 34 | 18 |
| $Na_3PO_4$ | 51 | 31 | 19 |
| $Na_2CrO_4$ | 50 | 32 | 19 |
| $Na_2Cr_2O_7$ | 50 | 32 | 8 |
| $TiO_2$ | 38 | 30 | 11 |
| $MnO_2$ | 39 | 24 | 10 |
| $SnO_2$ | 42 | 25 | 14 |

A second series of tests were conducted similar to the above procedure with the following results:

| ADDITIVE | CORROSION RATE (mils/yr) | | |
|---|---|---|---|
| | 2 Days | 4 Days | 30 Days |
| $CaAlO_2$ | 50 | 40 | 16 |
| $Na_4P_2O_7$ | 48 | 37 | 17 |
| $BaCr_4$ | 46 | 35 | 14 |
| $CaHPO_4$ | 36 | 25 | 11 |
| $BaMnO_4$ | 57 | 39 | 14 |
| $Ba(MnO_4)_2$ | 55 | 35 | 14 |
| $BaPO_4$ | 44 | 30 | 13 |
| None (100% NaOH) | 57 | 39 | 32 |

A third series of tests were conducted following the same procedure as above with these results:

| ADDITIVE | Corrosion Rate (mils/yr) | | |
|---|---|---|---|
| | 2 Days | 4 Days | 30 Days |
| None (92% NaOH-8% $NaNO_3$) | 62 | 39 | 21 |
| $K_4P_2O_7$ | 37 | 24 | 10 |
| $K_2Cr_2O_7$ | 39 | 26 | 14 |

Some preferred heat storage compositions are as follows; all figures are in percent by weight.

| | Composition 1 | Composition 2 |
|---|---|---|
| NaOH | 83 | 88 |
| $NaNO_3$ | 8 | 8 |
| $K_4P_2O_7$ | 5 | - |
| $MnO_2$ | 0.2 | 0.2 |
| KOH | 0.8 | 0.8 |
| NaCl | 1.5 | 1.5 |
| $Na_2CO_3$ | 1.5 | 1.5 |

What is claimed is:

1. A method of transferring heat so that it may be readily available for heat exchange purposes, comprising heating to a temperature of about 250° to about 1250° F. in a steel container, a substantially anhydrous heat storage medium comprising at least three components;
   a. a composition of at least 50 percent by weight of an alkali metal hydroxide;
   b. 1 to 49 percent by weight of an alkali metal nitrate; and,
   c. 0.1 to 30 percent by weight of an additive selected from the group consisting of iron, ferrites, $MnO_2$, $SnO_2$, $TiO_2$ alkali metal and alkaline earth metal aluminates, chromates, carbonates, dichromates, manganates, permanganates, phosphates, pyrophosphates and mixtures thereof and subsequently withdrawing heat from said heat storage medium.

2. The method of claim 1 wherein the alkali metal hydroxide is sodium hydroxide, the alkali metal nitrate is sodium nitrate and the temperature employed ranges from 250° to 1,000° F.

3. The method of claim 1 wherein the components of the heat storage medium comprises at least about 85 percent sodium hydroxide, 5 to 10 percent sodium nitrate and 0.1 to about 5 percent sodium dichromate.

4. A heat storage composition comprising at least three components:
   a. a substantially anhydrous composition of at least 50 percent by weight alkali metal hydroxide,
   b. 1 to 49 percent by weight alkali metal nitrate and,
   c. 0.1 to 30 percent by weight of an additive selected from the group consisting of iron, ferrites, $SnO_2$, $TiO_2$, alkali metal and alkaline earth metal aluminates, chromates, dichromates, manganates, permanganates, phosphates, pyrophosphates and mixtures thereof.

5. The composition of claim 4 comprising at least about 85 percent by weight sodium hydroxide, and about 5 to 10 percent sodium nitrate.

6. The composition of claim 4 which comprises about 90 percent sodium hydroxide, about 8 percent sodium nitrate and about 1 percent of an additive selected from the group consisting of $SnO_2$, alkali metal and alkaline earth metal chromates, dichromates and mixtures thereof.

7. The method of claim 1 wherein the composition employed comprises by weight about 88% NaOH, about 8% $NaNO_3$, about 0.2% $MnO_2$, about 0.8% KOH, about 1.5% NaCl and about 1.5% $Na_2CO_3$.

8. The composition of claim 4 comprising by weight about 83% NaOH, about 8% $NaNO_3$, about 5% $K_4P_2O_7$, about 0.2% $MnO_2$, about 0.8% KOH, about 1.5% NaCl and about 1.5% $Na_2CO_3$.

9. The method of claim 1 comprising a substantially anhydrous mixture of at least about 85 percent by weight sodium hydroxide, 5 to 10 percent by weight sodium nitrate and 0.1 to 5 percent by weight of an additive selected from the group consisting of alkali metal carbonate, $MnO_2$, alkali metal dichromate and mixtures thereof.

10. The method of claim 1 comprising a substantially anhydrous mixture of about 85 percent by weight sodium hydroxide, 5 to 10 percent by weight sodium nitrate, and 0.1 to 5 percent by weight of an additive selected from the group consisting of an alkali metal carbonate, alkali metal phosphate, $MnO_2$ and mixtures thereof.

* * * * *